United States Patent [19]
Cerruti

[11] Patent Number: 4,912,646
[45] Date of Patent: Mar. 27, 1990

[54] METHOD FOR DETECTING THE FUEL LEVEL IN THE TANK OF A MOTOR VEHICLE

[75] Inventor: Eraldo Cerruti, Turin, Italy

[73] Assignee: Fiat Auto S.p.A., Turin, Italy

[21] Appl. No.: 144,007

[22] Filed: Jan. 15, 1988

[30] Foreign Application Priority Data

Jan. 16, 1987 [IT]  Italy ................... 67023 A/87

[51] Int. Cl.$^4$ ............... G01F 23/24; G06F 15/24
[52] U.S. Cl. ................... 364/509; 73/304 R; 73/308; 340/450.2; 340/620
[58] Field of Search ............ 364/509, 442; 73/304 C, 73/308, 313, 295, 304 R; 340/450, 450.2, 620

[56] References Cited

U.S. PATENT DOCUMENTS

| | | | |
|---|---|---|---|
| 4,296,472 | 10/1981 | Sankis | 364/509 |
| 4,402,048 | 8/1983 | Tsuchida et al. | 364/509 |
| 4,470,296 | 9/1984 | Kobayashi | 73/113 |
| 4,487,066 | 12/1984 | Pardi et al. | 364/509 |
| 4,502,124 | 2/1985 | Grohmann et al. | 364/509 |
| 4,513,616 | 4/1985 | Bezard et al. | 364/509 |
| 4,611,287 | 9/1986 | Kobayashi et al. | 364/422 |
| 4,625,284 | 11/1986 | Suzuki | 364/509 |

FOREIGN PATENT DOCUMENTS

| | | |
|---|---|---|
| 0101998 | 3/1984 | European Pat. Off. . |
| 2849066 | 5/1980 | Fed. Rep. of Germany . |
| 2534375 | 4/1984 | France . |
| 2578049 | 8/1986 | France . |
| 2012433 | 7/1979 | United Kingdom . |
| 2124390 | 2/1984 | United Kingdom . |

Primary Examiner—Felix D. Gruber
Attorney, Agent, or Firm—Sughrue, Mion, Zinn, Macpeak & Seas

[57] ABSTRACT

The level indicated on the instrument panel of the motor vehicle results from a processing operation, including the calculation of a weighted average value, whereby the effects of accidental phenomena such as agitation of the fuel within the tank during movement of the motor vehicle are dispensed with.

13 Claims, 7 Drawing Sheets

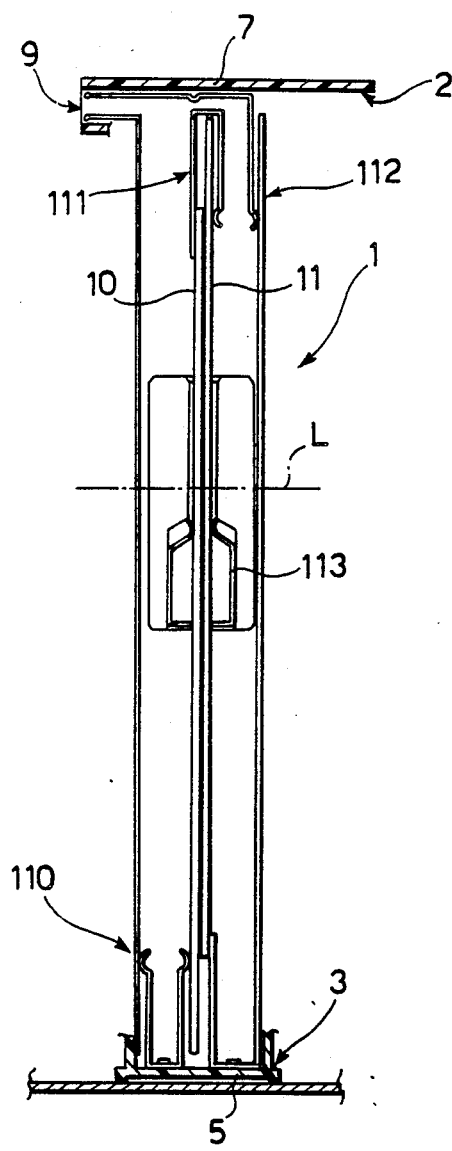
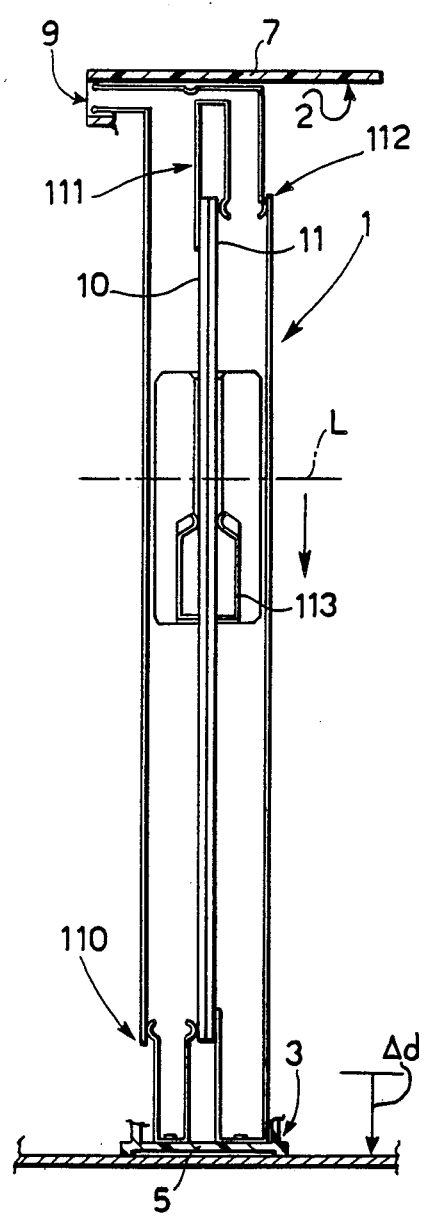

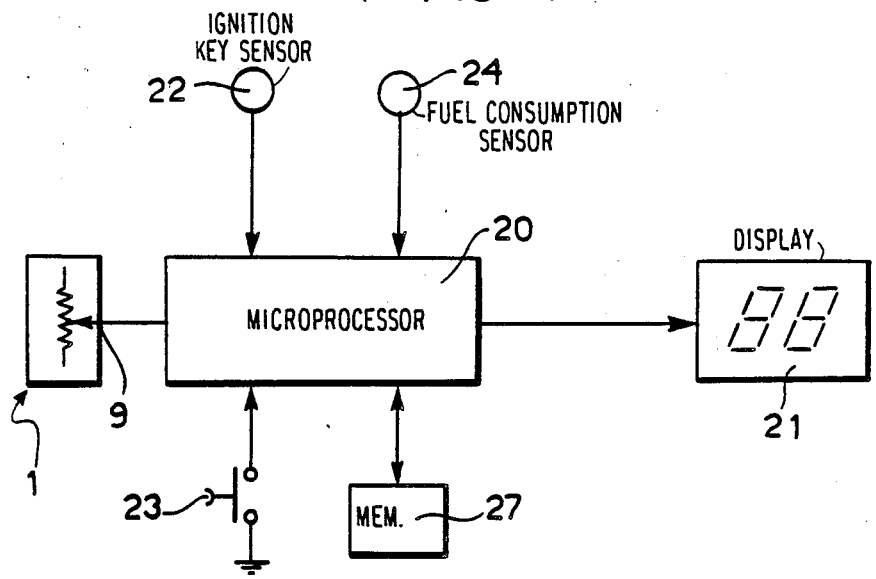
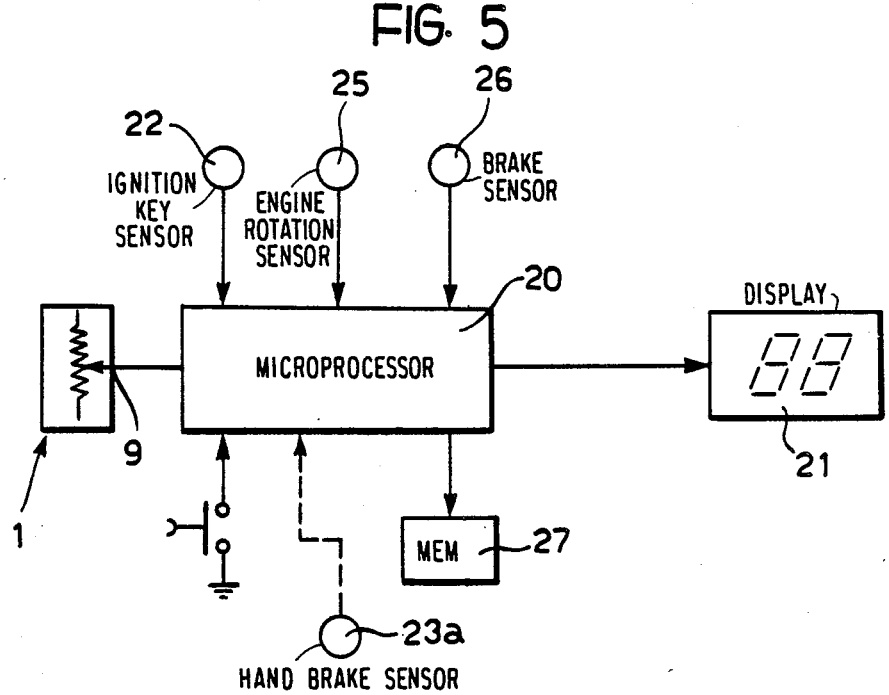

METHOD FOR DETECTING THE FUEL LEVEL IN THE TANK OF A MOTOR VEHICLE

The present invention relates in general to detecting the fuel level in the tank of a motor vehicle.

The invention has been developed with particular attention to its use in motor vehicles in which the content of fuel tank is indicated as a digital value in liters on the dashboard observed by the driver.

For this application, it is necessary to provide measurement means whose indication must be precise, coherent and complete over the entire possible operating range (tank empty—tank completely full), with the possibility of ensuring that the indication is not influenced by any variations in the capacity of the tank due to tank deformations, such as those resulting from the phenomenon currently termed bulging. This phenomenon is often apparent in tanks, particularly tanks of flattened form and/or of plastics material.

The invention also aims to eliminate another disadvantage often encountered in known fuel-level measuring devices, that is, the presentation on the instrument panel of detected levels which oscillate, even upwardly, as a result of the particular travelling conditions of the motor vehicle (bumps, curves, ascending or descending travel . . . ).

In order to achieve these objects, the method of the present invention provides for the detecting signal provided by the fuel level sensor to be processed fo subsequent presentation on the instrument panel so that any increasing variations in the presented signal are accepted only when it is ascertained that there has been a new supply of fuel or when the driver displays a desire to update the value indicated as a result of variations in the attitude of the motor vehicle.

Thus, the presentation of increased values during travel of the vehicle is avoided: in fact, these increasing variations usually correspond to simple jolting of the fuel within the tank.

In general, the level presented to the driver is updated cyclically by the calculation of the average value given by a weighted average of the value previously indicated and the new value measured. In particular, decrements of the value indicated of only one liter at a time are accepted even when the value detected is several liters less than that previously memorised and presented. In order to avoid the decrements being anomalously close together, in the case motor vehicles provided with a function for measuring the fuel consumption, the updating of the value indicated may be carried out only after the consumption of a certain quantity (for example, half a liter) of fuel has been detected from the previous updating. Alternatively, in motor vehicles without a function for measuring consumption, it is possible for the updating to be carried out periodically every time the engine has effected a certain number of revolutions, possibly chosen between two different counting values, depending on the operating conditions. It is also possible to provide a threshold rotational speed, ensuring that the updating of the level if effected after a number of revolutions which may be different according to whether the rate of rotation of the engine is above or below this threshold.

The invention will now be described, purely by way of non limiting example, with reference to the appended drawings, in which:

FIGS. 2 and 3 are two electrical diagrams illustrating two different possible operating conditions of the apparatus of FIG. 1.

FIGS. 4 and 5 illustrate the structure of two processing devices usable together with the apparatus of the invention in block schematic form, and FIGS. 6a to 6d describe, in the form of a flow-chart, a suitable operating sequence of a device such as those shown in FIGS. 4 and 5.

Figure 1:
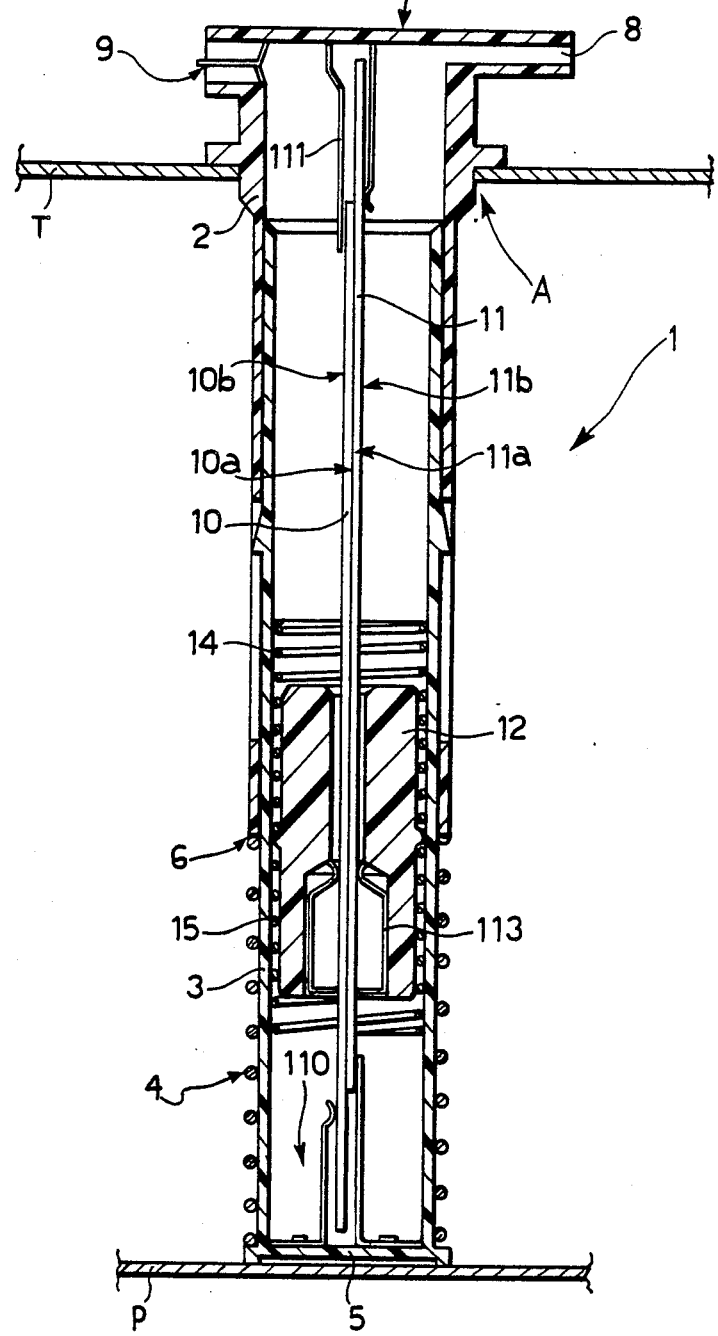
FIG. 1 is a longitudinal sectional view of apparatus for measuring the fuel level in the tank of a motor vehicle.
Figure 6A:
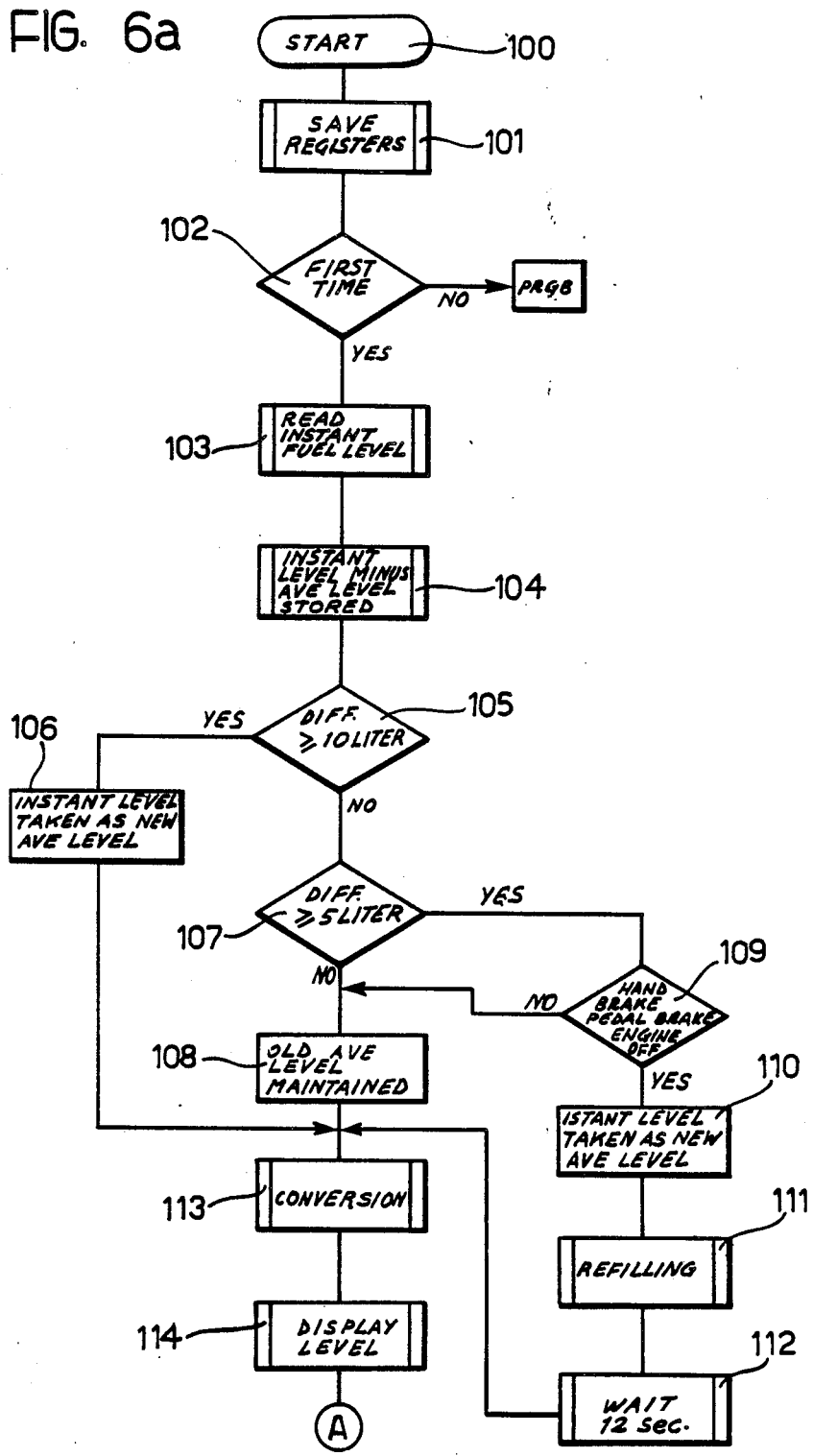
Figure 6B:
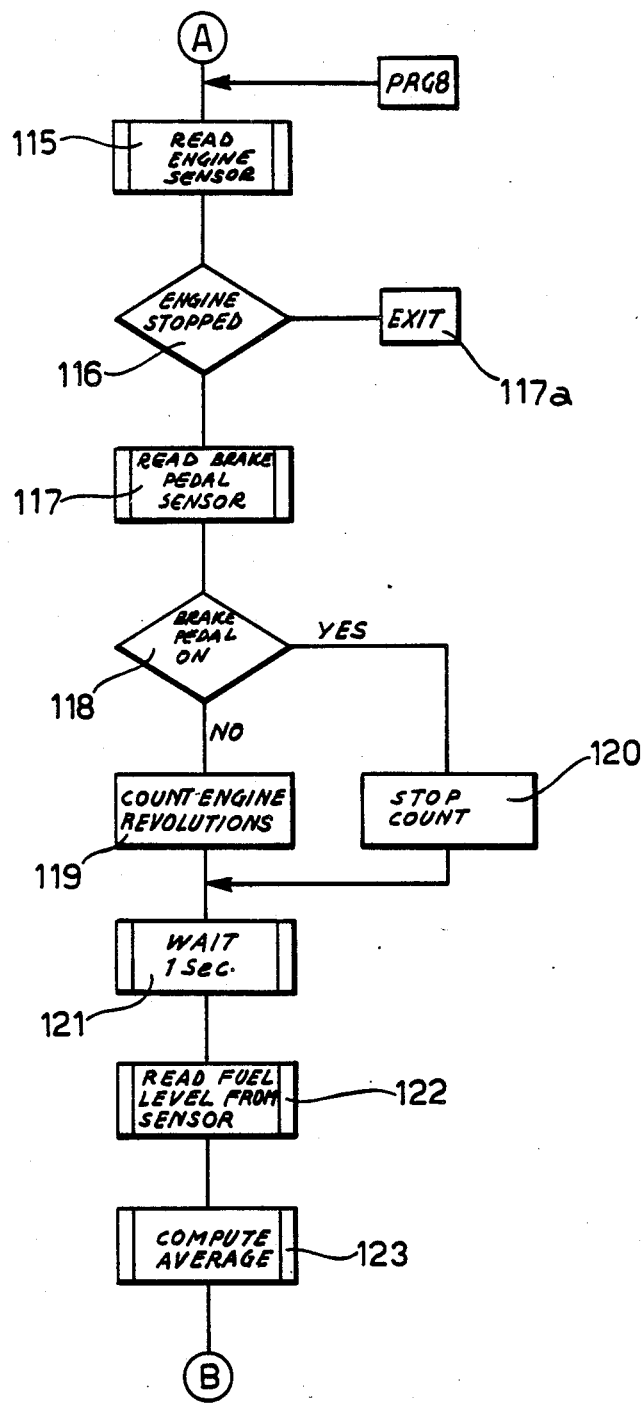
Figure 6C:
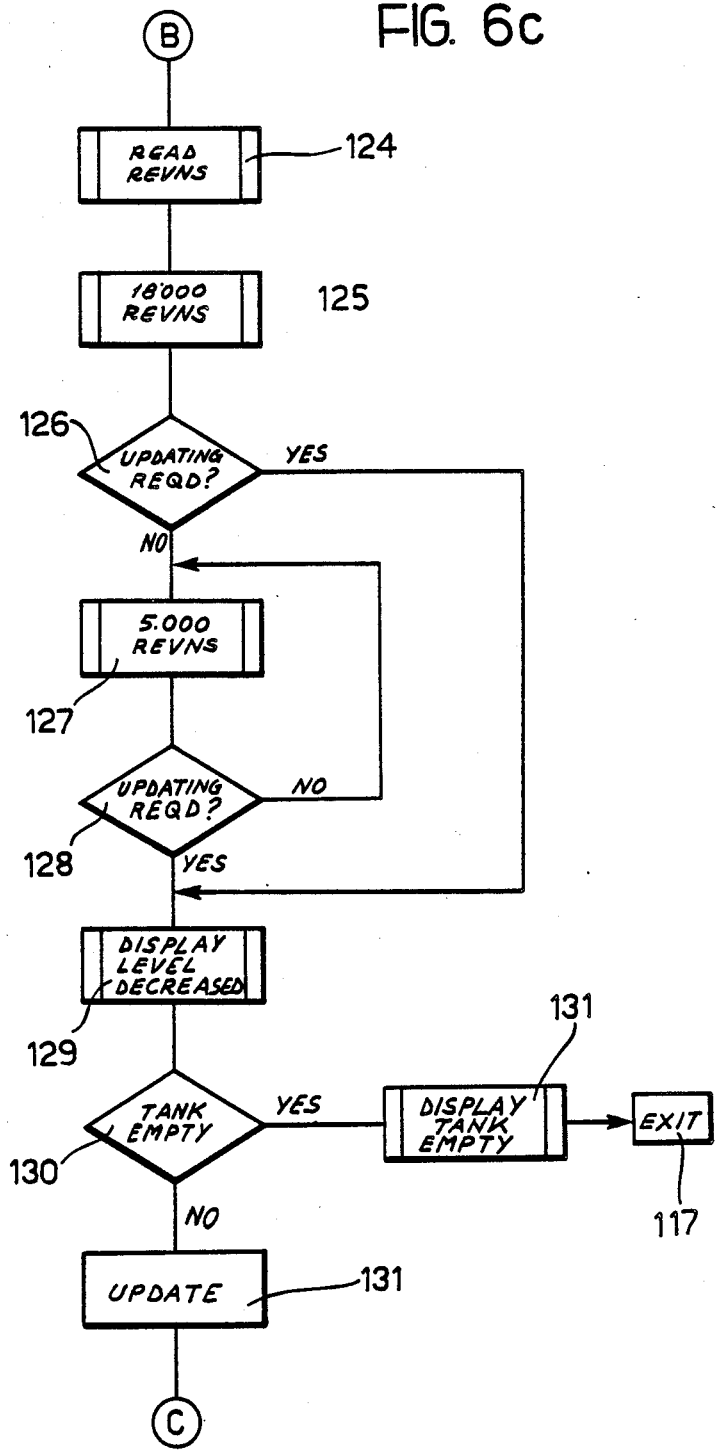
Figure 6D:
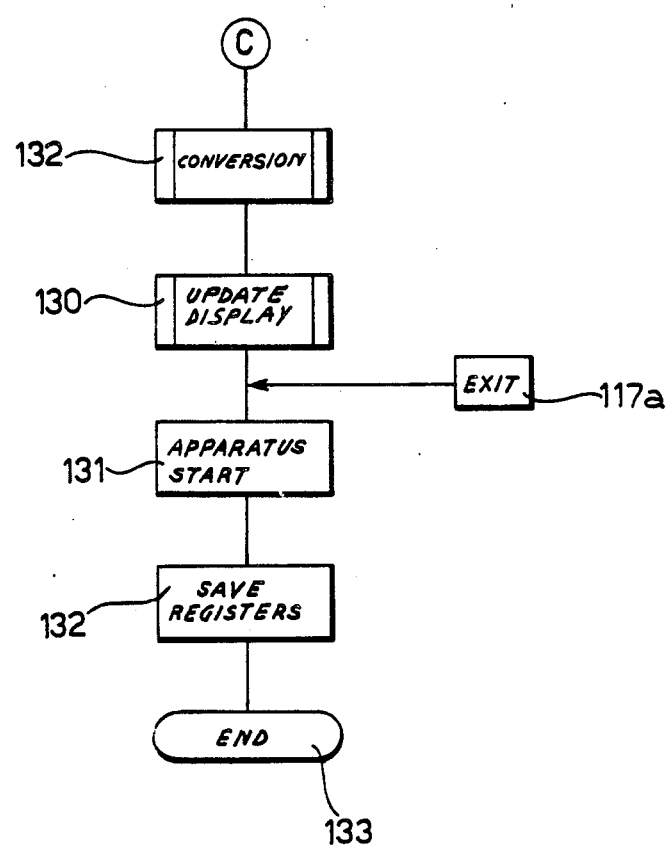

In the drawings, measuring apparatus is generally indicated 1 and is intended for association with the fuel tank T of a motor vehicle in order to measure the quantity (level) of fuel therein. An apparatus is considered herein which is substantially similar to that described in French patent application 2,578,049.

FIG. 1 shows only an upper part of the tank T, which has an aperture A for the insertion of the measuring apparatus 1, and a portion of the bottom P.

In general, the apparatus 1 can be likened to a telescopic rod which can be inserted within the tank T through the aperture A so as to extend approximately vertically.

The telescopic structure of the apparatus 1 is provided by the coupling of a first tubular body 2 fixed to the upper wall of the tank T and a second tubular body 3 fitted slidably in the first body 2. The second body 3 is able to slide relative to the first body 2 in the direction of the main axis of the tubular structure so formed so as to be constantly in contact with the bottom P of the tank T.

For this purpose, a spring 4 may be fitted around the lower portion of the body 3 so as to act as thrust means between a washer 5, which is provided in this portion and projects slightly radially relative to the body 3 itself, and the lower end 6 of the body 2 surrounding the body 3.

The spring 4 acts to maintain the body 3 (more precisely, the base 5) firmly in contact with the bottom P even when this moves away from the upper part of the tank T in which the aperture A is provided as result of deformations (bulging) caused by the weight of fuel in the tank T itself.

The upper end of the body 2 is closed by a cap portion 7 which faces out of the tank T and carries a breather pipe 8 enabling fuel in the tank 1 to enter freely into the cavity in the tubular structure formed by the bodies 2 and 3 even when the tank T is almost completely full. The presence of the breather pipe 8 is therefore important in order to avoid that the detecting action of the fuel level may be unaccurate in proximity of the maximum levels (full or almost full).

Within the cap 7 there is also provided an electrical connecting element 9 which enables the apparatus 1 to be connected to a processing device according to criteria which will be better explained below.

On each of the bodies 2 and 3, and more precisely starting from the respective end wall (top wall of the cap 7 of the body 2 and the base 5 of the body 3), there extends a respective resistive element 10, 11 (rheophore) essentially in alignment with the central axis of the tubular structure formed by the bodies 2, 3.

The two resistive elements 10, 11 may be constituted by flattened rods having insulating faces 10a, 11a and an electrically conductive faces 10b, 11b of linear resistance values $\rho$ which are determined precisely. The positions of assembly of the element 10 on the body 2 and of the element 11 on the body 3 are chosen so that the two electrically conductive faces 10b, 11b are opposite each other, while the insulating faces 10a and 11a face each other so as to be relatively slideable as a result of the relative sliding of the bodies 2 and 3 caused by the spring 4 upon variations of the distance between the bottom P and the aperture A in which the apparatus 1 is inserted.

The resistive elements 10 and 11 have associated connecting elements (blade contacts) for connecting respective portions of the resistive elements 10 and 11 in series with each other relative to the terminals of the connector 9.

More precisely, there are provided (FIGS. 2 and 3):

a first blade contact 110 branching from one of the terminals of the connector 9 and provided with a shoe part fixed to the base 5 of the body 3, which is kept in contact with the conductive face 10b of the element 10 in all relative positions of the bodies 2 and 3;

a second blade contact 111 fixed to the cap 7 of the body 2 in electrical contact with the upper end of the element 10, and having a shoe part which is kept in contact with the conductive face 11b of the element 11 in all positions taken up by the bodies 2 and 3, and a third blade contact 112 (not clearly visible in FIG. 1, since it is hidden by other parts) having a terminal fixed to the base 5 of the body 3 in electrical contact with the lower end of the element 11 and a shoe part which ensures its electrical contact with the other terminal of the connector 9 in all relative positions of the bodies 2 and 3.

An annular body, generally indicated 12, is fitted around the resistive elements 10 and 11 so as to be movable axially within the cavity defined by the bodies 2 and 3 together.

The body 12 is made of a material (for example, foamed material) which can float in the fuel introduced into the tank T.

The body 12 thus takes up a position relative to the bodies 2 and 3 (and hence the resistive elements 10 and 11) indicative of the level of the free surface of the fuel within the tank T; this happens also in proximity of the maximum levels (full or almost full), due to the presence of the breather pipe 8.

A further electrical blade contact 113 (having, for example, a generally resilient arcuate configuration) is mounted in the body 12 and has two arms or shoes which are kept constantly in contact with the outer electrically-conductive faces 10b and 11b of the resistive elements 10 and 11.

The contact 113 thus acts as a bridge between the resistive conductive faces 10b, 11b of the elements 10 and 11 and enables the electrical resistance value measurable between the terminals of the connector 9 on descent of the float body 12 towards the base P to be reduced.

Thus, the positions of mounting of the contacts 110 and 113 are such that, whatever the relative positions of the bodies 2, 3 and 12, it is possible to detect between the terminals of the connector 9 the value of the electrical resistance (resistance in ohms) of the resistive element constituted by the series connection of the portion of the resistive element 10 between the contact shoes 110 and 113 that slide against the face 10b and the portion of the element 11 which is beneath the shoe of the contact 113 that slides against the face 11b.

Thus, it may be deduced from a comparison of the diagrams of FIGS. 2 and 3 that this resistance is in any case indicative of the position of the float body 12 and hence of the level L of the fuel within the tank T.

In fact, any variation $\Delta d$ which increases the distance between the bottom P of the tank T and the aperture A, due to a deformation (bulging) phenomenon—for a given quantity of fuel in the tank—causes:

lowering of the float body 12 and the contact 113 relative to the body 2 by $\Delta d$, axial sliding of the body 3 relative to the body 2 and consequent axial relative sliding of the resistive elements 10 and 11 by $\Delta d$, and sliding of the shoes of the contact 110 by $\Delta d$ relative to the element 10 fixed to the body 2.

In electrical terms, this corresponds to:

a reduction in the overall length of the portion of the element 10 which is beneath the contact 113 by $\Delta d$; however, this reduction is compensated for by the lowering of the contact 110 by $\Delta d$ as a result of the lowering of the body 3 so that the resistance of the portion of the element 10 between the contacts 110 and 113 remains constant, and the following by the contact 113 of the face 11b of the element 11 which is lowered as a result of the lowering of the body 3; the resistance of the portion of the element 11 beneath the contact 113 thus also remains constant.

This means that if the base P of the tank T deforms (bulges) it has no effect on the measuring.

Preferably, two springs 14 and 15 (FIG. 1) are mounted around the float body 12 (in accordance with a known solution), the function of which is to bear against the opposite ends of the structure formed by the bodies 2 and 3 when the float 12 is close to the aperture A (tank almost completely full) or close to the base 5 (tank almost completely empty). Thus, precise reading of the maximum and minimum fuel levels in the tank is allowed.

The diagrams of FIGS. 4 and 5 relate to two possible solutions for the use of the apparatus 1.

In both cases, the apparatus 1 is connected by a cable applied to the connector 9 to a processing unit 20 which controls the operation of a visual display unit 21 provided on the dashboard of the motor vehicle. A galvanometric function is provided in the unit 20 and, according to known principles, is able to convert the resistance detected between the terminals of the connector 9 into an electrical signal which is indicative of the fuel level L in the tank T.

The unit 21 is usually constituted by a 7-segment digital presentation unit on which appear numbers which identify the numerical value of the measurement of the fuel level in the tank 1 in liters or other units.

In addition to the resistive signal provided by the apparatus 1 and converted by the unit 20 into a fuel level signal, the unit 20 itself also receives signals from a sensor 22 which detects the position of the igniton key of the motor vehicle (engine off, engine on) or a reset signal which can be generated selectively by the driver by means of a push-button 23.

The diagram of FIG. 4 relates to the application of the invention to a motor vehicle provided with a signal indicative of the quantity of fuel consumed by the engine of the motor vehicle during a predetermined time interval.

The diagram of FIG. 5, however, relates to the embodiment of the invention in a motor vehicle in which no fuel consumption sensor is provided but in which signals indicative of the rate of rotation of the engine (sensor 25) and of the actuation of the brake pedal (sensor 26) are available.

In both cases, the unit 20 is constituted by a processing device, typically a microprocessor (for instance a Motorola 68705 R3μP), which can be programmed to control the operation of the device according to the principles which will now be described.

In general, the unit 20 has a memory 27, for example a RAM memory, in which it is possible to store the level signal obtained from the apparatus 1 for presentation of the corresponding digital signal on the unit 21. The presence of the memory 27 enables the unit 21 to display a numerical signal which does not necessarily correspond to the signal detected at that moment by the apparatus 1. The value stored in the memory 27 and thus the value which is presented on the unit 21 is periodically updated at predetermined intervals, however, to take account of variations in the signal provided by the apparatus 1, which is sensed by unit 20 with a fixed timing, e.g. at every second.

In the solution illustrated in FIG. 4, this updating of the value stored and displayed is carried out each time the consumption sensor 24 indicates that the engine has consumed a certain quantity of fuel, for example half a liter of fuel. In the solution to which the diagram of FIG. 5 relates, however, the updating is carried out each time the rate of rotation signal provided by the sensor 25 (which may be a sensor connected to the ignition coil of the engine), integrated (for example by counting) by the unit 20, indicates that the engine has effected a certain number of revolutions.

In both cases the updating of the stored value is effected by replacing the stored value in the memory 27 by an updated value defined as a weighted average established on the basis of a certain number a+b of samples according to an equation of the type:

$$v_m' = \frac{a \cdot v_m + b \cdot v_{n1}}{a + b} \quad (I)$$

where $v_m$ is the given value previously stored in the memory 27, $v_{n1}$ is the new value of the reading corresponding to the measurement signal provided at that moment by the apparatus 1 (newly measured value), $v_m'$ is the new given value which is stored in the memory 27 and presented on the unit 21, and b is chosen preferably to be equal to two or about two (values substantially equal to two). This choice is considered to be the best with the purpose of having an updated average value which may follow without delays the variations of the fuel level in the tank (which may occur when choosing to close to 1) and is not influenced significantly by accidental momentaneous variations such as those deriving from jolting (which may occur when choosing for b values about 3 or above).

For the parameter a, the choice which has been found to be particularly convenient at present is the value 118. Experiments show, however, that the choice of parameter a is in fact less critical than the choice of parameter b.

The use of a weighted average of the type expressed by the equation (I) enables the effect of accidental variations in the measurement signal to be cancelled from the value presented to the driver.

The rejection of these accidental variations may be made even stronger by ensuring that the updated value is not used if the new value $v_m'$ is higher or lower by less than one of the counting units used for the visual display (for example, 1 liter) relative to the value $v_m$ previously stored, so that the old value is being preserved as the value presented to the driver. Moreover, if the updated value $v_m'$ is less than the previous value $v_m$ by more than one counting unit (liters), the updating is in any case effected by reducing the stored value and hence the value presented on the unit 21 by only one unit (one liter).

According to a solution which may be embodied in the scheme according to FIG. 5, the unit 20 detects the value of the rate of rotation signal provided by the sensor 25 and compares it with a threshold level of the order, for example, of 3500 revolutions per minute.

If the rate of rotation of the engine is greater than or equal to this threshold, the unit 20 updates the level signal intended to be presented on the unit 21 each time the engine has effected 6,500 revolutions. On the other hand, if the rate of rotation of the engine is less than 3500 revolutions per minute, the unit 20 updates the value stored and displayed after the engine of the motor vehicle has effected 20,000 revolutions. Another feasible updating strategy is that of effecting an updating of the displayed value irrespective of the rate of rotation of the engine at different counting intervals (e.g. 18,000 and 5,000 revolutions) depending on whether, at the moment at which a new average value is calculated, the requirements for updating are met or not. In other words, upon starting the engine and after each updating (with a change in the value displayed), a counting is effected of the engine revolutions up to a first predetermined value (e.g. 18,000 revolutions). At the end of such counting, a new average value $v_m'$ is calculated (formula I), checking whether the requirements for updating the displayed value exist or not (i.e. whether or not the new average value $v_m'$ is greater or less than one counting unit lower than the value previously displayed). If the requirements are met, the updating is effected, and a new counting is started up to said first predetermined value. If, on the contrary, updating is not required, counting is started again of the engine revolutions up to a second predetermined value lower than the first (e.g. 5,000 revolutions). When such a lower limit is reached, a check is made again of whether the requirements for updating are met, based on a new calculated average. If the requirements are met, updating is effected, and the counting is started again towards the higher predetermined value (18,000 revolutions). In the opposite case, updating is not effected and the counting is repeated towards the lower predetermined value (5,000 revolutions). In general terms, searching for the possibility of making more distant in time the updating steps of the displayed value (without any loss in terms of signalling accuracy) aims at avoiding that the value displayed may be influenced in an erroneous manner by accidental phenomena, for instance during a wide radius curve or while running on a slope, such situations causing the mass of the fuel in the tank to assume for a fairly long time an uncommon arrangement with the tank. At any rate, the revolution counting function is stopped when the sensor 26 indicates that the brake pedal is pressed.

The memory 27 is arranged so as to preserve its content (record) even when the motor vehicle engine has stopped. The stoppage of the engine, resulting from the rotation of the ignition key into the corresponding position, is detected by the sensor 22.

When the key is returned to the ignition position, the unit 20 compares the measured value provided by the device 1 with the previous value of which a record has been kept in memory 27. If the signal provided by device 1 indicates an increase in the level by a certain amount (for example, 10 liters), indicative of the fact that refilling has taken place during the stoppage of the engine, the memorized value presented on the unit 21 is updated correspondingly.

In the opposite case, the updating is not effected unless the driver indicates a desire to update in any case by pressing the reset button 23.

As an alternative to the pushing of the reset button 23, the updating of the stored value may be carried out automatically, even when the value detected does not indicate refilling, when the motor vehicle is kept in predetermined conditions for a certain period of time, for example, when the vehicle is kept for 15 seconds with the key in the ignition position but with the engine stopped and with the brake pedal and the handbrake (with which a sensor 23a is associated) disengaged.

FIG. 6a to 6d illustrate, in the form of a flow chart, an operating sequence of a device such as that shown in FIG. 5.

It is assumed that operation of the device is started at 100 as the ignition key of the motor vehicle is turned. It is also assumed that the sequence shown in FIGS. 6a to 6d is repeated in a cyclical manner at given intervals of, say 50 ms, on the basis of an interrupt operating scheme.

After a standard register save phase 101, a check is immediately made at 102 of whether the instant is the first time the operating sequence is run after turning of the ignition key.

This is done by testing a logical signal provided by sensor 22, which has different values according to whether the ignition key is in the "on" or "off" position.

If a negative result is obtained (sequence already run), then a jump is made (PRG 8) to a following portion of the flow chart which will be considered below. If a positive result is obtained (indicating that the ignition key has just been turned to the "on" position) then the fuel level signal instantaneously provided by apparatus 1 is read at 103 and the difference between that level and the average value a record of which has been kept in memory 27 is calculated at 104.

A check is then made at 105 of whether that difference is greater (or equal) than a given amount, say 10 liters, this indicating that refilling of the tank has been effected while the engine was stopped.

If a positive result is obtained, the instant fuel level value provided by apparatus 1 is taken as the given value to be stored and displayed to the driver (step 106).

If, alternatively, a negative result is obtained, the check is repeated at 107 with a lower threshold level, say 5 liters.

If a negative result is obtained, the instant fuel level value provided by apparatus 1 is disregarded and the average value stored in memory 27 is kept as the reference value to be used for further processing (step 108).

If a positive result is obtained from check 107, then a further check is made at 109 of whether the handbrake (sensor 23a), the pedal brake (sensor 26) are actuated, and the engine is turning or not (sensor 25).

If either or both of the brakes are actuated upon or the engine is running, processing is returned to phase 108, the increase of the fuel level detected by apparatus being attributed to the fact that the vehicle is parked or stopped on a slope or running a curve, these operating conditions giving rise to an uneven distribution of the fuel within the tank which produce a change of output of apparatus.

If a positive result is obtained from check 109, indicating that both the brakes are not actuated upon and that the engine is stopped, the new fuel level signal provided by apparatus 1 is substituted for the old average value stored in memory 27 (step 110) while a message indicating that refilling is waited for is displayed on unit 21. After a waiting phase of, for instance, 12 seconds, processing is resumed by a conversion step 113 which is also effected after phase 106 or phase 108.

The set of steps 105 to 112 aims at distinguishing the various situations which may arise according to whether a substantial refilling (more than 10 liters), a minor refilling (between 5 and 10 liters) or no refilling at all were effected (the fuel signal level instantaneously provided by apparatus 1 in the last case considered differs from the old average value stored only as a consequence of particular operating conditions of the vehicle) and the situation where refilling is being awaited.

The conversion phase 113 (which may be omitted in those cases where the fuel level signal provided by apparatus 1 varies according to a strictly linear function of the fuel level in the tank), is mainly directed at correcting some unlinearities in the behaviour of apparatus 1.

Basically, step 113 corresponds to a mapping function of the signal provided by apparatus 1 into a fuel level signal which is displayed in unit 21 in a following step 114.

The processing sequence is continued by a reading step 115 of the signal provided by sensor 25 after which a check is made of 116 of whether the engine is stopped or not.

Step 115 is directly reached after step 102 as a consequence of jump PRG 8 whenever the sequence is not run for the first time.

If the engine is found to be stopped in check 116, then the sequence is interrupted by an exit step 117a (see below).

If the engine is found to be running, then the signal provided by sensor 24 is read at 117 and a check is then made 118 of whether the brake pedal is actuated upon or not.

If the brake pedal is not actuated upon, then a counting is started of the engine revolutions based on the signal provided by sensor 25.

If, altenatively, the brake pedal is actuated upon, the counting function is by-passed (step 120) which means, in practice, that the counting function is interrupted.

After either of steps 119 and 120 a waiting step 121 is effected after which the fuel level signal provided by apparatus 1 is read at 122.

In a subsequent step, designated 123, the average value is computed according to formula (I) referred to in the foregoing.

Thereafter the number of revolutions of the engine is read at 124 until completion of a first number of revolutions (usually 18,000 revolutions) is found at 125.

After that a check is made at 126 of whether the new average value computed is lower than the old value stored in memory 27 and displayed on unit 21 of a given amount, say 1 liter.

In other words, a check is made in step 126 of whether the requirements for updating the level presented to the driver on unit 21 are met or not. If a negative result is obtained (that is the requirements for updating are not met, since the difference between the value displayed at present and the new average value computed is less than one liter) then counting of the engine revolution is resumed at 127 for an additional amount of revolutions, say 5000 revolutions.

Thereafter the check of step 126 is repeated at 128. If the requirements for updating are not yet met, the counting step 127 up to 5000 revolutions is repeated until a positive result is obtained from check 128.

At that point the fact that the fuel level has decreased of one counting unit (1 liter) may be displayed in step 129, which may also be reached directly from step 126 in the case that a positive result is obtained already at that stage.

After step 129 (which may be dispensed with in those cases when no display of the fuel consumption is required) a check is made at 130 of whether the fuel level has reached a minimum level. If this is the case, then a corresponding meassage is displayed on unit 21 in a step 131, after which processing is continued towards the exit step 117a.

If the minimum level has not been reached, then the average value stored in memory 27 is updated in step 131 causing also the value displayed on unit 21 to be updated.

This is done through a conversion function 132 wholly similar to that performed in step 113 with the aim of dispensing with any non-linearities of apparatus 1.

After that, actual updating of the value displayed on unit 21 is effected in step 130.

After that, a command is sent at step 131 to the interface towards apparatus 1 indicating that a new sample of the fuel level signal provided by apparatus 1 must be entered for further processing. Step 131 may also be reached directly from the exit step 117a.

After a final register save step 132, the sequence comes to an end at 133, after which the sequence is repeated from step 100 in a cyclical manner as indicated in the foregoing.

I claim:

1. A method for detecting and displaying outside the fuel level in the tank of a motor vehicle by means of apparatus which can output a signal indicative of the fuel level in the tank of the motor vehicle, comprising the steps of:
    memorizing for outside display a given value indicative of the fuel level in the tank of the motor vehicle, and
    updating, at predetermined instants, said given value by detecting at least one newly measured value corresponding to said signal indicative of the fuel level in the tank of the motor vehicle output by said apparatus, calculating a weighted average value of said memorized value and said at least one newly measured value and memorizing said weight average value as an updated given value for outside display;
    said updating of said given value being carried out at instants where said weighted average value is lower tha the given value previously memorized by a given amount while the ignition is in the "on" position and said updating of said given value being carried out to display a new value when the ignition is turned to the "on" position to reflect refilling of said tank a predetermined amount when the ignition was previously in the "off" position.

2. A method according to claim 1 wherein said weighted average valve is calculated as:

$$v_m' = \frac{a\,v_m + b\,v_{n1}}{a + b}$$

where $v_m'$ is said weighted average value, $v_m$ is said given value, $n_{n1}$ is said newly measured value and a and b are a first and second weighing constants respectively.

3. A method according to claim 2, wherein said second weighing constant (b) is selected substantially equal to two.

4. A method according to claim 2 wherein said first weighing constant (a) is selected substantially equal to 118.

5. A method according to claim 1, including the steps of detecting fuel consumption of a motor vehicle engine and updating said given value at predetermined instants corresponding to the consumption of a predetermined quantity of fuel by the engine.

6. A method according to claim 1, including the steps of detecting a number of rotations effected by a motor vehicle engine, and updating said given value at predetermined instants corresponding to the completion of a predetermined number of rotations by the engine.

7. A method according to claim 6, including the steps of:
    detecting rate of rotation of said motor vehicle engine
    comparing the rate of rotation of the engine with a respective threshold level and generating a comparison signal having first and second different logic levels in dependence on the result of the comparison, and
    updating said given value at predetermined instants corresponding to the completion by the engine of a first and second predetermined number of rotations when the comparison signal assumes the first and second logic levels, respectively.

8. A method according to claim 6, including the steps of detecting the actuation of a vehicle brake, and interrupting the detection of the number of rotations effected by the engine during actuation of the brake.

9. A method according to claim 6 wherein:
    said predetermined instants for updating said given value are identified by counting the completion, by the motor vehicle engine, of one of a first and a second number, lower than said first number, of engine rotations,
    when said given value is updated, counting proceeds towards completion of said first number of engine rotations, and
    when said given value is not updated, counting proceeds towards completion of said second number of engine rotations.

10. A method according to claim 9, wherein said first number is substantially equal to 18,000.

11. A method according to claim 10, wherein said second number is substantially equal to 5,000.

12. A method according to claim 1, wherein said given value is memorized for outside display as discrete units of counting, and where said weighted average is lower than the given value previously memorized of a given amount, the said new given value memorized is corrected to a value corresponding to a decrement of only one of the counting units relative to the given value previously memorized.

13. A method according to claim 1, including the steps of:
keeping, upon stoppage of the motor vehicle engine, a record of said given value,
detecting, upon starting of the engine, a newly measured value provided by said apparatus,
comparing said given value of record which was kept upon stoppage of the engine with said newly measured value detected upon restarting of the engine, and
replacing said given value of record which was kept upon stoppage of the engine by said newly measured value detected on restarting of the engine only when said newly measured value detected on restarting of the engine is greater than the value of record which was kept upon stoppage of the engine by a predetermined amount.

* * * * *